United States Patent
Haruna et al.

(10) Patent No.: US 9,106,626 B2
(45) Date of Patent: Aug. 11, 2015

(54) METHOD, APPARATUS AND COMPUTER PROGRAM PRODUCT FOR COPYING CONTENT BETWEEN SERVERS

(75) Inventors: Adamu Haruna, Tampere (FI); Hans Rohnert, München (DE); Ivo Sedlacek, Kurim (CZ); Zoltan Ördögh, Mississauga (CA)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 32 days.

(21) Appl. No.: 13/059,619

(22) PCT Filed: Oct. 17, 2008

(86) PCT No.: PCT/EP2008/064006
§ 371 (c)(1),
(2), (4) Date: May 2, 2011

(87) PCT Pub. No.: WO2010/043266
PCT Pub. Date: Apr. 22, 2010

(65) Prior Publication Data
US 2011/0208830 A1    Aug. 25, 2011

(51) Int. Cl.
*G06F 15/16* (2006.01)
*H04L 29/08* (2006.01)
*G06F 17/30* (2006.01)
*H04L 12/58* (2006.01)

(52) U.S. Cl.
CPC .......... *H04L 67/06* (2013.01); *G06F 17/30861* (2013.01); *H04L 12/584* (2013.01); *H04L 51/08* (2013.01); *H04L 67/02* (2013.01)

(58) Field of Classification Search
CPC ..... H04L 67/02; H04L 12/58; H04L 2209/80; G06Q 10/107
USPC .......................................................... 709/217
See application file for complete search history.

(56) References Cited

U.S. PATENT DOCUMENTS

| | | | | |
|---|---|---|---|---|
| 5,903,723 A | * | 5/1999 | Beck et al. | 709/200 |
| 6,760,886 B1 | * | 7/2004 | Nadon et al. | 715/234 |
| 7,054,905 B1 | * | 5/2006 | Hanna et al. | 709/206 |
| 7,685,300 B2 | * | 3/2010 | Burrows et al. | 709/230 |

(Continued)

FOREIGN PATENT DOCUMENTS

WO    01/75651 A2    10/2001

OTHER PUBLICATIONS

N. Freed et al., "Definition of the URL MIME External-Body Access-Type", Network Working Group, Request for Comments: 2017, Oct. 1996, pp. 1-6.

*Primary Examiner* — Douglas W Owens
*Assistant Examiner* — Monica C King
(74) *Attorney, Agent, or Firm* — Squire Patton Boggs (US) LLP

(57) ABSTRACT

Arrangements for forwarding content from a message storage server to a content sharing server of a Converged IP Messaging (CPM) system are described. An HTTP PUT request is issued by a user/client to the content sharing server, with the request identifying the location of the content on the message storage server. In response to the HTTP PUT request, the content sharing server issues a request, such as an IMAP download request, to the message storage server (either directly or via an intermediary). In response, the message storage server provides the content, without that content being sent to the user device.

20 Claims, 4 Drawing Sheets

(56) References Cited

U.S. PATENT DOCUMENTS

| | | | |
|---|---|---|---|
| 7,761,500 B1* | 7/2010 | Eckert et al. | 709/203 |
| 8,150,927 B2* | 4/2012 | Ikonen et al. | 709/206 |
| 8,176,186 B2* | 5/2012 | McCanne et al. | 709/228 |
| 8,306,016 B2* | 11/2012 | Rosenberg et al. | 370/352 |
| 2003/0093565 A1* | 5/2003 | Berger et al. | 709/246 |
| 2005/0021963 A1* | 1/2005 | Tomkow | 713/171 |
| 2006/0085429 A1* | 4/2006 | Wener et al. | 707/10 |
| 2007/0174402 A1* | 7/2007 | Tomkow | 709/206 |
| 2008/0172483 A1* | 7/2008 | Mickeleit | 709/223 |
| 2009/0286516 A1* | 11/2009 | Sedlacek et al. | 455/414.1 |

* cited by examiner

METHOD, APPARATUS AND COMPUTER PROGRAM PRODUCT FOR COPYING CONTENT BETWEEN SERVERS

TECHNOLOGICAL FIELD

The invention relates to copying or moving content between servers, in particular, but not exclusively, to copying content between servers storing different types of communication data, including multimedia files.

BACKGROUND

Modern mobile communication devices are used for a wide range of purposes in addition to traditional telephony. For example, it is known to use instant messaging or email to send messages that include multimedia objects such as images, audio files and video clips. Such messages often include large amounts of data that a user may wish a network to store independently of the messages they were originally attached to.

The Open Mobile Alliance (OMA) is developing a Converged IP Messaging (CPM) specification that provides for the convergence of multi-media communication services. The Open Mobile Alliance publishes much of its work on its website (www.openmobilealliance.org).

FIG. 1 shows a system, indicated generally by the reference numeral 2, comprising a client device 4 and a central system 6. The client device 4 includes a message and media storage client 8. The central system 6 includes a message and media storage server 10. The client device 4 may be a CPM-enabled device and the central system 6 may be a CPM system.

The message and media storage server 10 provides management and storage functions for messages and other media and is used, for example, to store users' multimedia data. The message and media storage client 8 manages a particular user's resources at the server 10 and also manages the resources stored locally at the client device 4.

The message and media storage server 10 may be one component or consist of two components, one storing messages and another one storing media. The same can hold for the client side, i.e., it can host a message storage client and a media storage client.

Data stored in the message and media storage server 10 can be classified in two different ways:
1. Message-like contents (such as CPM messages, CPM conversations, and CPM session histories, including their attachments); and
2. Unstructured contents, e.g. plain binary files (of any type).

In some circumstances, a user may wish to transfer an attachment of a message from an area storing message-like contents (including the said attachment) to an area containing plain binary files. This may, for example, be done when a user is no longer interested in the whole message, but would like to keep the attachment. For example, if a user receives a message including an image as an attachment, the user may wish to copy the image to a separate location and then delete the original message.

FIG. 2 is a flow chart 20 showing, in broad terms, how such an attachment may be transferred. The flow chart 20 includes a first step 22 in which the attachment is downloaded from the message and media storage server 10 to the client 4. Next, at step 24, the attachment is uploaded from the client 4 to the area of the server 10 that stores plain binary files.

The transfer of data via the client device 4 involves two over-the-air data transmissions. In the event that the end file is not stored at the client device 4, these over-the-air transmissions represent an unnecessary use of network resources.

The present invention seeks to address at least some of the problems outlined above.

BRIEF SUMMARY

In one exemplary embodiment, a method of forwarding content is provided. The method may comprise: issuing a request to a first server, wherein the request requests that content at a second server be forwarded to the first server and wherein the request includes an indication of a location of the content on said second server; issuing a content access request from the first server to the second server; and forwarding said content from said second server to said first server in response to the content access request. The request issued to the first server may be issued by a user. The content may be multimedia data, such as image, audio or video data.

In another exemplary embodiment, a method of forwarding content is provided. The method may comprise: receiving a request to copy content (for example from a user, a user device, or a client) at a first server, the request to copy content requesting that content from a second server be provided to said first server, the request to copy content including an indication of a location of the content on the second server; issuing a content access request from the first server to the second server; and receiving said content at said first server in response to the content access request. The content may be multimedia data, such as image, audio or video data.

In a further exemplary embodiment, a method of forwarding content is provided. The method may comprise receiving a content access request from a first server (e.g. a content sharing server) at a second server (e.g. a message storage server), the content access request including an indication of a location of the content on the second server; and forwarding said content from said second server to said first server in response to the content access request. The content may be multimedia data, such as image, audio or video data.

In another exemplary embodiment, an apparatus is provided. The apparatus may provide a first server and a second server, wherein: the first server is adapted to issue a content access request to the second server in response to receiving a request to copy content (for example from a user, a user device, or a client), wherein the request to copy content includes an indication of a location of content stored on the second server; and the second server is adapted to provide said content to said first server in response to the content access request.

In yet another exemplary embodiment, an apparatus is provided. The apparatus may provide a first server (such as a content sharing server) adapted to: receive a request to copy content, the request to copy content requesting that content at a second server be provided to the first server, the request to copy content including an indication of a location of the content on the second server; issue a content access request to the second server; and receive said content in response to the content access request.

In a further exemplary embodiment, an apparatus is provided. The apparatus may provide a first server (such as a content sharing server). The first server may comprise: means for receiving a request to copy content (for example from a user), the request to copy content requesting that content at a second server be provided to the first server, the request to copy content including an indication of a location of the content on the second server; means for issuing a content access request to the second server; and means for receiving said content in response to the content access request.

Thus, the present invention enables a user to request that content at a second server (such as a message storage server of a CPM system) be provided to a first server (such as a content sharing server of a CPM system), without that content being passed via the user device. In many forms of the invention, the original content at the second server is retained.

The first server may store the content received from the second server. Thus, content can be copied from the second server to the first server in response to the request to copy content, without the user needing to receive the content. The content may be deleted from the second server, if desired.

The request to copy content may be an HTTP PUT request. In one particular form of the invention, the request to copy content is an HTTP PUT request with content reference. Other formats for the request to copy content are possible, including non HTTP formats. IMAP is one such alternative.

The indication of the location of the content on the second server included in said request to copy content may be provided as an IMAP uniform resource indicator.

The content access request issued by the first server to the second server may take the form of an IMAP request; for example, the content access request may include an IMAP uniform resource indicator indicating the location of the content on the second server. Alternatively, the content access request may take the form of an HTTP request, such as an HTTP GET request. Again, other formats are possible, such as requests in accordance with FTP and gopher protocols.

In some embodiments of the invention, the requested content is forwarded directly from the second server to the first server. In other forms of the invention, the requested content is forwarded from the second server to the first server via an intermediary, such as an adapter. The adapter may take the form of a separate server. Alternatively, the adapter may be provided as part of the first server. By way of example, the requested content may be forwarded from the second server to a dedicated resource of the first server and may then be further transferred within the first server. The content access request sent by the first server to the second server may be sent via the said adapter.

The location of the content on the second server may be identified by a base uniform resource locator in combination with a second uniform resource locator. In some forms of the invention, the request from the user received at the first server includes the base uniform resource locator and the second uniform resource locator. In some other forms of the invention, the request from the user received at the first server includes the second uniform resource locator and the first server provides the base uniform resource locator.

The request to copy content received at the first server may include a base uniform resource locator and a second uniform resource locator. The base uniform resource locator may refer to a resource on the first server; in such an arrangement, the content access request may include an HTTP GET request issued to the resource and the resource may issue an IMAP request to the second server. Alternatively, the base uniform resource locator may refer to a resource on the second server; in such an arrangement, the content access request may include an HTTP GET request issued by the first server to the resource on the second server. In a further alternative, the base uniform resource locator may refer to a resource on a third server; in such an arrangement, the content access request may include an HTTP GET request to the resource on the third server and the resource may issue an IMAP request to the second server.

In some embodiments of the invention, the first server is an HTTP server. Other server types are possible. The first server may be a WebDAV server. Further, other non-HTTP servers (such as an IMAP server) are possible.

In some embodiments of the invention, the second server is an IMAP server. Again, other server types are possible. For example, the second server may be an HTTP server. In some embodiments of the invention, both the first and second servers are HTTP servers.

The first server may take the form of a content sharing server. The second server may take the form of a message storage server. The first and second servers may form part of a Converged IP Messaging (CPM) system. According to some aspects of the invention, a file is created or replaced at a content sharing server using the content downloaded from said message storage server.

In another exemplary embodiment, a system, such as a converged IP messaging system, is provided. The system may comprise a content sharing server and a message storage server, wherein: the content sharing server is configured to receive a request to copy content (for example from a user) requesting that content at the message storage server be provided to the content storage server, the request to copy content including an indication of a location of the content on the message storage server; the content sharing server is configured to issue a content access request to the message storage server; and the message storage server is configured to provide the content to said content sharing server in response to the content access request. The system may include any of the aspects of the invention described above.

In another exemplary embodiment a computer program product is provided. The computer program product may be configured to: receive a request to copy content (for example from a user), the request to copy content requesting that content at a server be provided to the computer program product, the request to copy content including an indication of a location of the content on the server; issue a content access request to said server; and receive said content at said computer program product in response to the content access request. The computer program product may include a computer readable medium. The computer program product may include any of the features of the invention described above.

In another exemplary embodiment a computer program product is provided. The computer program product may be configured to: receive a request to copy content from a user, the request to copy content requesting that content be forwarded from a second server to a first server, the request to copy content including an indication of a location of the content on the second server; issue a content access request to said second server; provide said content to said first server in response to the content download request; and store said content at said first server. The computer program product may include a computer readable medium. The computer program product may include any of the features of the invention described above.

BRIEF DESCRIPTION OF THE DRAWINGS

Embodiments of the invention are described below, by way of example only, with reference to the following numbered Figures.

DETAILED DESCRIPTION

As discussed above, data stored in the message and media storage server 10 can be classified as either message-like contents or unstructured content (e.g. plain binary files). The two types of data may be accessed in a different manner. For example, Internet Message Access Protocol (IMAP) is one possible protocol for managing message-like contents. HTTP and Web-based Distributed Authoring and Versioning (Web-DAV), which is an extension of HTTP, are two possible protocols for managing the plain binary files.

Since the types of the stored objects are different and the management protocols are different, it is a logical consequence to split the message and media storage server 10 into two parts. Such an arrangement is shown in FIG. 3.

Figure 3:
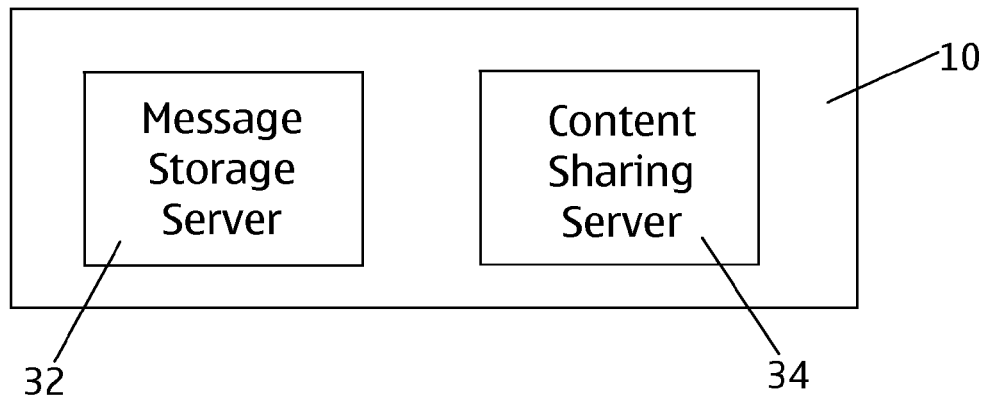
FIG. 3 is a block diagram of part of a system in accordance with an aspect of the present invention.

FIG. 3 shows the message and media storage server 10 referred to above. The message and media storage server 10 includes a message storage server 32 and a content sharing server 34. The message storage server 32 contains the message-like contents discussed above (including any attachments to the messages): the content sharing server 34 contains the plain binary files discussed above. In some embodiments of the invention, data stored at the message storage server 32 is accessed using the IMAP protocol and that server may be referred to as an IMAP server. Similarly, in some embodiments of the invention, data stored at the content sharing server 34 is accessed using the HTTP protocol and that server may be referred to as an HTTP server.

Figure 1:
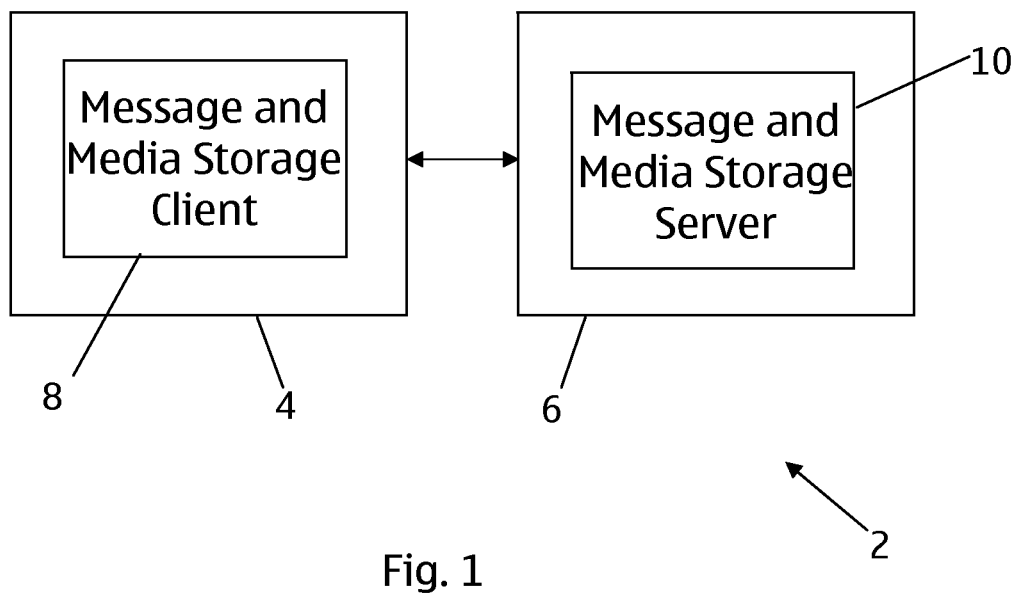
FIG. 1 is a block diagram of part of a known communication system.
Figure 2:
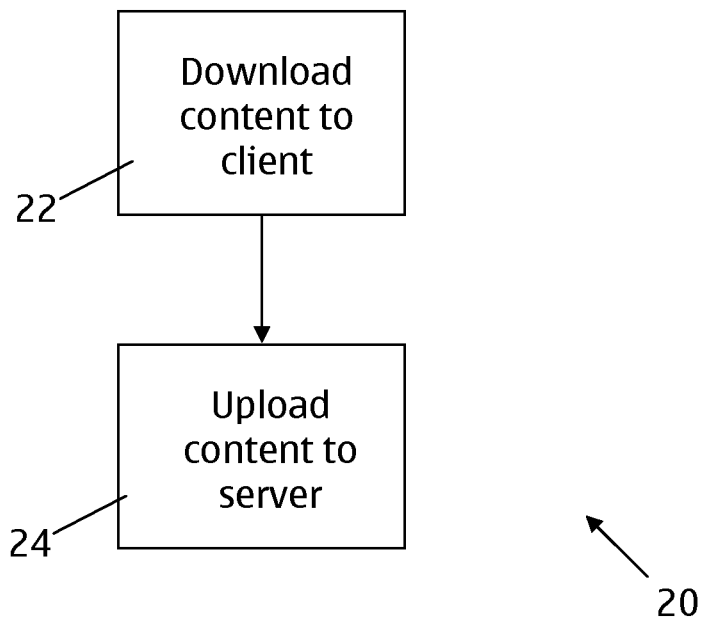
FIG. 2 is a flow chart demonstrating an aspect of the use of the system of FIG. 1.
Figure 4:
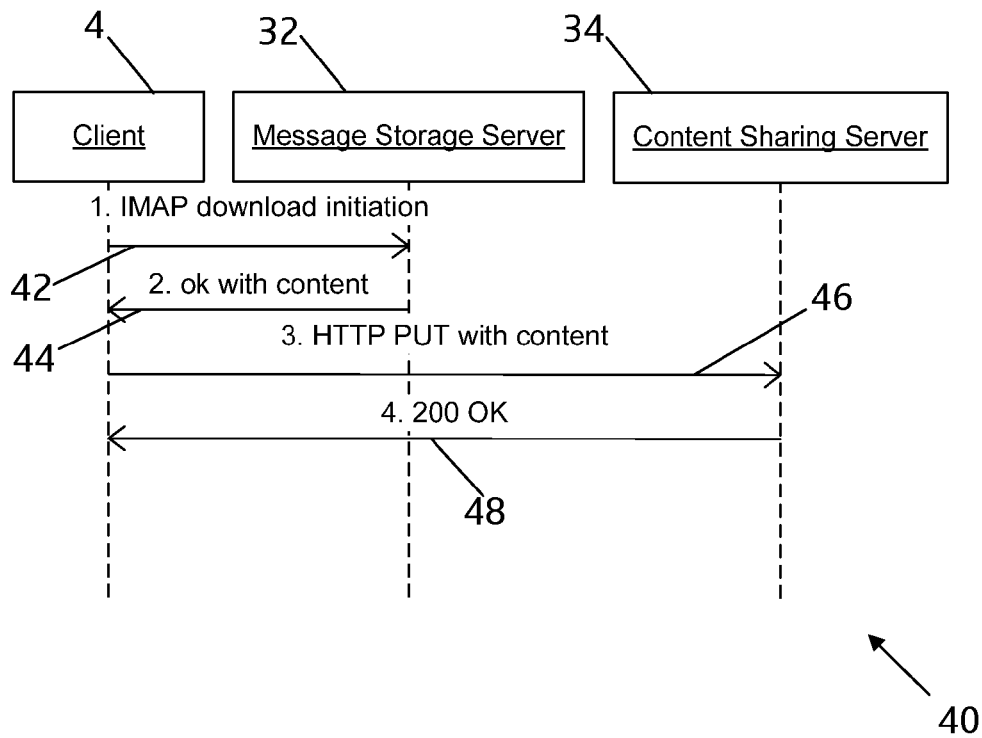
FIG. 4 is a message sequence demonstrating an aspect of the use of the system of FIG. 3.

FIG. 4 shows a message sequence, indicated generally by the reference numeral 40, showing how the algorithm 20 described above with reference to FIG. 2 can be used to transfer data between the message storage server 32 and the content sharing server 34. The message sequence 40 shows the data being transferred from the client 4 to the content sharing server 34 using an HTTP PUT request, with the content being included in the request body.

The message sequence 40 begins with the client 4 issuing an IMAP download request 42 to the message storage server 32. In response, the message storage server 32 provides the requested content in message 44. The client 4 then sends the content to the content sharing server 34 as an HTTP PUT request 46. In response, the content sharing server issues an OK message 48 to the client 4. The IMAP download request 42 and the HTTP PUT request 46 may be issued by the message and media storage client 8 of the client 4.

The HTTP PUT request 46 may take the following form:

PUT /home/ivo/MyHelloWorld.txt HTTP/1.1
Host: myMediaStorage.operator.net
Content-Type: text/plain
Hello World!

Executing the HTTP PUT request 46 results in a file being created or replaced at the location given by the URL:

http://myMediaStorage.operator.net/home/ivo/MyHelloWorld.txt

The content of the file created (or replaced) at that location is the text "Hello World!". In this example, the content of the file obtained from the message storage server (the text "Hello World!") in the message 44 is included in the HTTP PUT request 46. It should be noted that the actual text is included in the body of the PUT request, in accordance with the normal use of the HTTP PUT request.

The message sequence 40 involves a first data transfer from the message storage server 32 to the client 4 and a second data transfer from the client 4 to the content sharing server 34. This wastes network resources and incurs unnecessary costs.

As discussed above, in an exemplary embodiment of the invention, the message storage server 32 is an IMAP server and the content sharing server 34 is an HTTP server. Thus, in the message sequence 40, content is obtained from the message storage server 32 using an IMAP request, and content is sent to the content sharing server 34 using an HTTP request.

FIGS. 5 to 8 show message sequences 50, 60, 70 and 80 respectively, in accordance with aspects of the present invention. Each of the message sequences 50, 60, 70 and 80 omits the IMAP download request 42 of the message sequence 40. Instead, in each case, an HTTP PUT request with content reference is sent from the client 4 to the content sharing server 34.

An HTTP PUT request with content reference differs from an ordinary HTTP PUT request in that, instead of the body of the request containing the actual content being transferred, the body of the request only contains a reference containing the location at which the content is stored. Further details regarding such requests can be found at http://www.ietf.org/rfc/rfc2017.txt. The HTTP PUT request with content reference is sometimes referred to in this specification as a request to copy content, since it requests that content at one server be copied to another server.

Each of the message sequences 50, 60, 70 and 80 makes use of the HTTP PUT request with content reference in a different way, as discussed in detail below.

Figure 5:
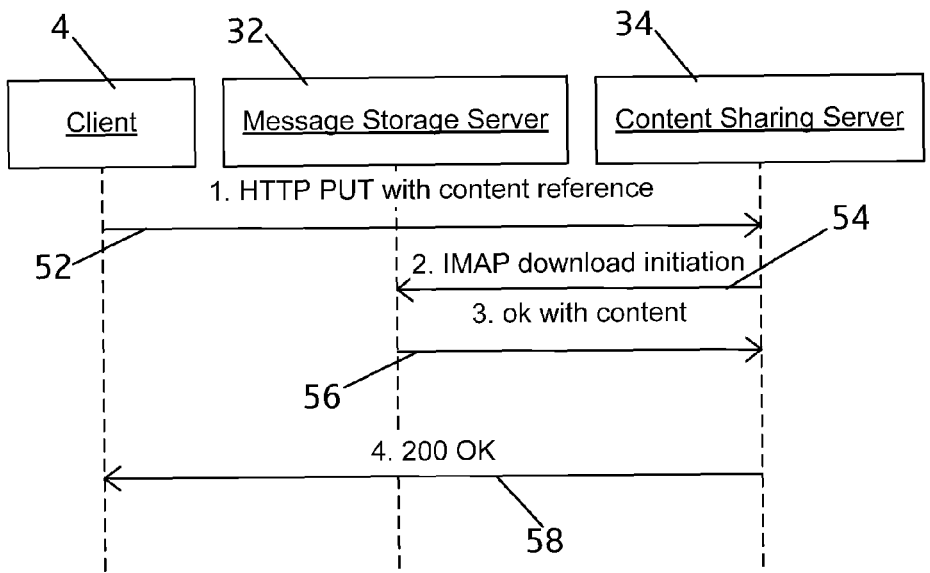
FIG. 5 is a message sequence demonstrating an aspect of the use of the system of FIG. 3 in accordance with an aspect of the present invention.

As shown in FIG. 5, the message sequence 50 begins with the client 4 issuing an HTTP PUT request with content reference 52 to the content sharing server 34.

In response to the request 52, the content sharing server 34 sends an IMAP download request 54 to the message storage server 32. The IMAP download request 54 is similar to the request 42 of the message sequence 40, except that the request 54 is sent from the content sharing server 34 (the eventual destination of the requested content) and not the client 4. In response to the request 54, the message storage server 32 provides the requested content in message 56. The message 56 is similar to the message 44, again, with the exception of the destination of the message.

In response to the message 56, the content sharing server issues an OK message 58 to the client 4.

Thus, as in the message sequence 40, the message storage server 32 receives an IMAP request and the content sharing server 34 receives an HTTP request.

The HTTP PUT request with content reference 52 may take the following form:

PUT /home/ivo/MyHelloWorld.txt HTTP/1.1
Host: myMediaStorage.operator.net
Content-type: message/external-body; access-type=URL;

URL="imap://MyMessageStorageServer.operator.net/ivo.sedlacek@
operator.net/MyFolder/MyMail/MyAttachment"

Executing the request 52 results in a file being created or replaced at the location given by the URL:
http://myMediaStorage.operator.net/home/ivo/MyHelloWorld.txt
using the attachment stored at:

imap://MyMessageStorageServer.operator.net/ivo.sedlacek@operator
.net/MyFolder/MyMail/MyAttachment Upon receipt of the request 52, the content sharing server 34 uses an integrated IMAP client to fetch the content identified by the IMAP uniform resource indicator (URI) (imap://MyMessageStorageServer.operator.net/ivo.sedlacek@operator.net/MyFolder/MyMail/MyAttachment) from the message storage server 32 and store it in the specified location of the content sharing server (steps 54 and 56 as discussed above). In order to do so, the content sharing server 34 must include an integrated IMAP client. In other words, the content sharing server needs to know how to handle IMAP URIs.

Figure 6:
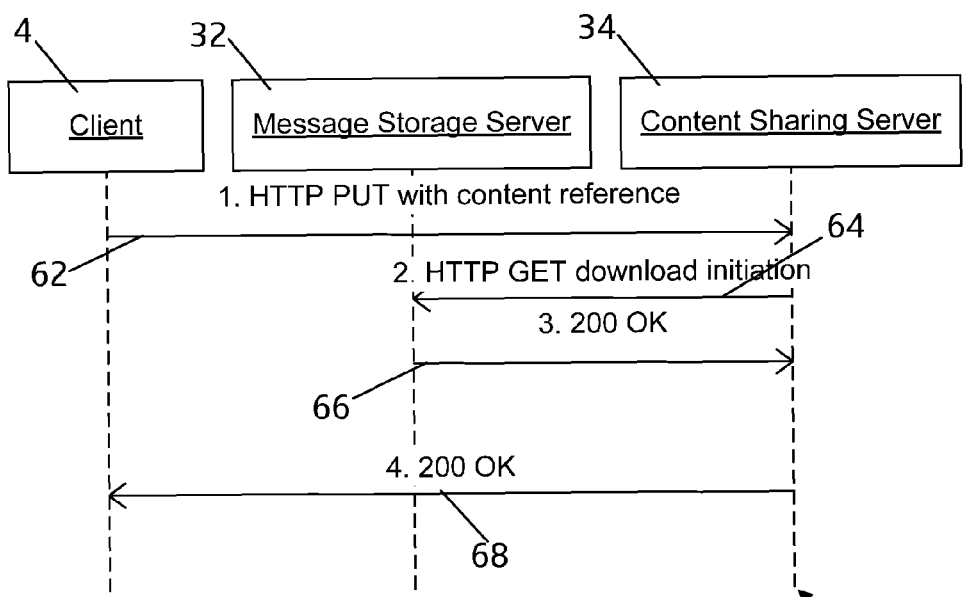
FIG. 6 is a message sequence demonstrating an aspect of the use of the system of FIG. 3 in accordance with an aspect of the present invention.

FIG. 6 shows a message sequence 60 in accordance with an aspect of the present invention. The message sequence 60 begins with the client 4 issuing an HTTP PUT request with content reference 62 to the content sharing server 34.

In response to the request 62, the content sharing server 34 sends an HTTP GET request 64 to the message storage server 32. The GET request 64 initiates a download of the relevant content from the message storage server 32 and is therefore similar to the IMAP download request 54 described above with reference to FIG. 5. In response to the request 64, the message storage server 32 provides the requested content in message 66. The message 66 is similar to the message 56 described above.

In response to the message 66, the content sharing server issues an OK message 68 to the client 4.

The HTTP PUT request with content reference 62 may take the following form:

PUT /home/ivo/MyHelloWorld.txt HTTP/1.1
Host: myMediaStorage.operator.net
Content-type: message/external-body;access-
type=URL;URL="http://MyMessageStorageServer.operator.net:1234
5/CPMRedirector?TakeFrom=imap%3A%2F%2FMyMessageStorageServer.
operator.net%2Fivo.sedlacek@operator.net%2FMyFolder%2FMyMail%
2FMyAttachment"

Executing the request 62 results in a file being created or replaced at the location given by the URL:
http://myMediaStorage.operator.net/home/ivo/MyHelloWorld.txt
using the attachment stored at:

imap://MyMessageStorageServer.operator.net/ivo.sedlacek@operator
.net/MyFolder/MyMail/MyAttachment The HTTP GET request 64 differs from the IMAP request 54 described above in that it is an HTTP request and not an IMAP request. An IMAP request is not possible, since, in this example, it is assumed that the content sharing server 34 is not able to issue an IMAP request, for example because the content sharing server 34 does not contain an integrated IMAP client. The HTTP GET request 64 specifies the base URI of the message storage server 32 as follows:

http://MyMessageStorageServer.operator.net:12345/CPMRedirector?
TakeFrom=

The location of the requested content is provided in the TakeFrom parameter of the HTTP GET request 64 thus:

imap://MyMessageStorageServer.operator.net/ivo.sedlacek@operator
.net/MyFolder/MyMail/MyAttachment Provided the message storage server 32 is able to understand HTTP requests, the message sequence 60 can be used, since the message storage server is able to use the TakeFrom parameter of the HTTP GET request 64 to access the content requested by the content sharing server.

Figure 7:
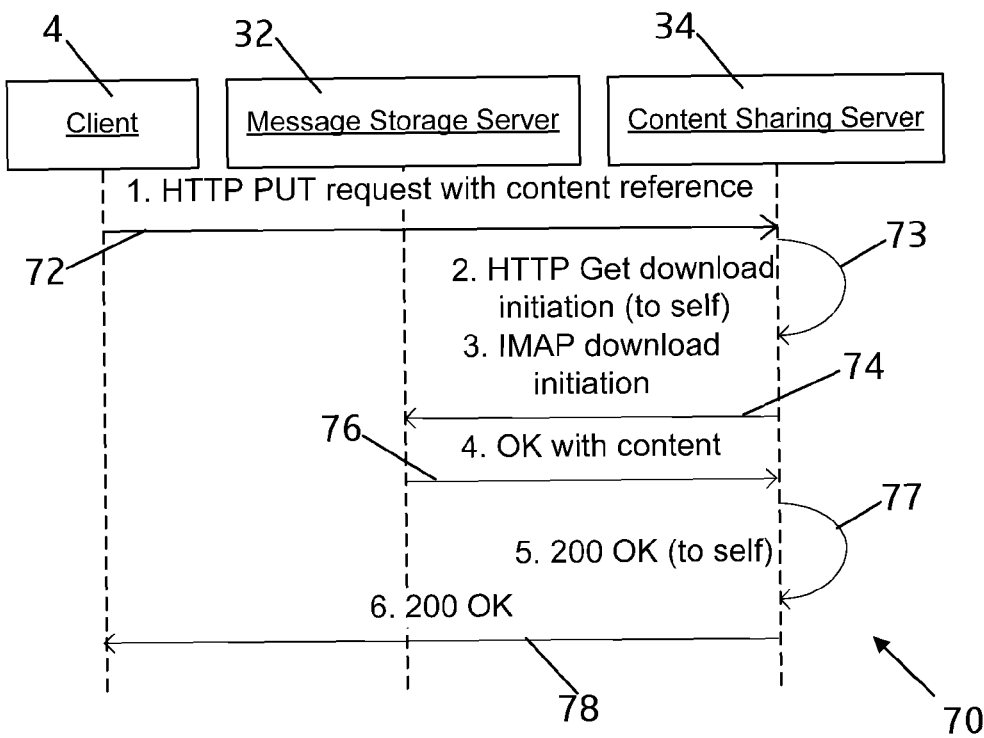
FIG. 7 is a message sequence demonstrating an aspect of the use of the system of FIG. 3 in accordance with an aspect of the present invention.

FIG. 7 shows a message sequence 70 in accordance with an aspect of the present invention. The message sequence 70 begins with the client 4 issuing an HTTP PUT request with content reference 72 to the content sharing server 34. In response to the request 72, the content sharing server 34 sends an HTTP GET request 73 to a different location on the content sharing server 34.

This different location hosts a resource (such as a dedicated process) on the content sharing server 34 that is able to issue IMAP requests upon receiving HTTP requests and HTTP responses upon receiving IMAP responses.

The HTTP GET request 73 initiates a download of the relevant content from the message storage server 32 using an IMAP download request 74. The request 74 is largely the same as the IMAP download request 54 described above with reference to FIG. 5. In response to the request 74, the message storage server 32 provides the requested content in message 76. The message 76 is similar to the messages 56 and 66 described above (although it should be noted that the messages 56 and 76 are in response to an IMAP request, whereas the message 66 is in response to an HTTP request, and is therefore implemented differently).

In response to the message 76, the content sharing server issues an OK message 77 to the originator of the request 73. The content sharing server 34 then sends an OK message 78 to the client 4.

The HTTP PUT request with content reference 72 may take the following form:

PUT /home/ivo/MyHelloWorld.txt HTTP/1.1
Host: myMediaStorage.operator.net
Content-type: message/external-body;access-type=URL;
URL="http://myMediaStorage.operator.net:9876/IMAPFetcher?Take
From=imap%3A%2F%2FMyMessageStorageServer.operator.net%2Fivo.s
edlacek@operator.net%2FMyFolder%2FMyMail%2FMyAttachment"

The message sequence 70 differs from the message sequence 60 in that, in response to the HTTP PUT request with content reference 72, an HTTP GET request is sent to a dedicated resource on the content sharing server, which itself sends an IMAP download request to the message storage server 32. Thus, the message storage server 32 receives an IMAP request, without the original requesting part of the content sharing server needing to be able to issue an IMAP request. Thus, the dedicated resource of the content sharing server acts as a kind of adapter that receives an HTTP request and issues an IMAP request (and also receives an IMAP response and forwards an HTTP response). Thus, the message sequence 70 can be used in scenarios where it is not possible to issue the original request as an IMAP request and the message storage server is not able to process an HTTP request.

The message sequence 70 differs from the message sequence 50 in the use of the dedicated resource on the content sharing server.

Figure 8:
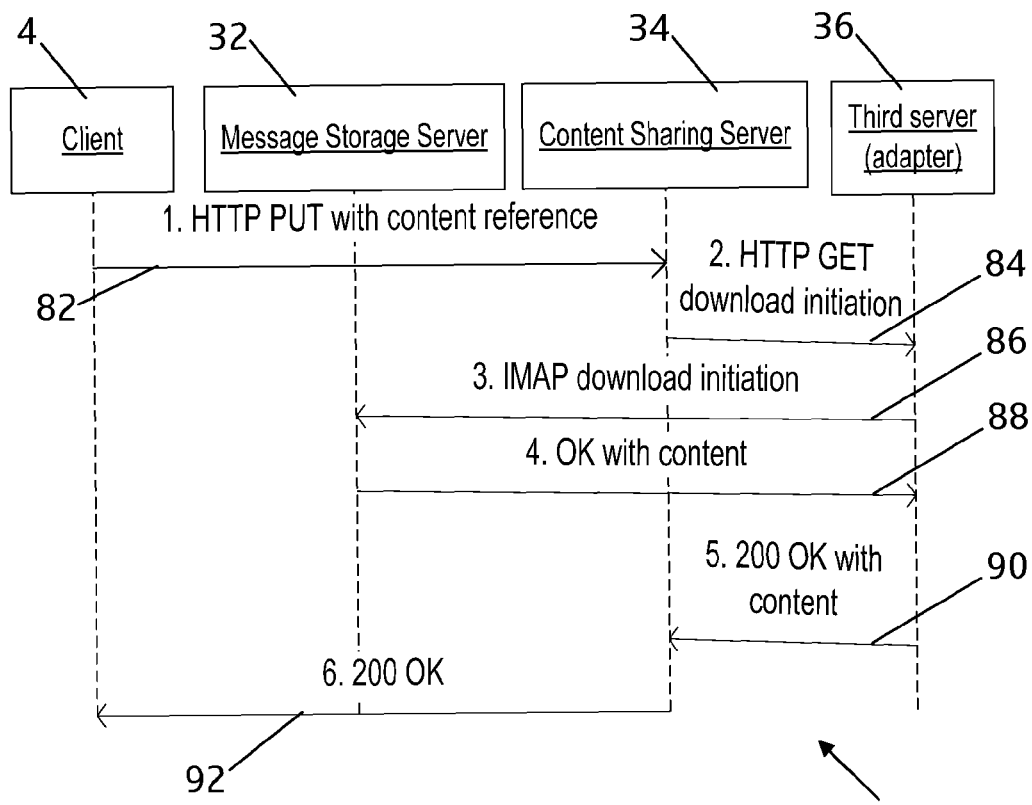
FIG. 8 is a message sequence demonstrating an aspect of the use of the system of FIG. 3 in accordance with an aspect of the present invention.

FIG. 8 shows a message sequence 80 in accordance with an aspect of the present invention. The message sequence 80 begins with the client 4 issuing an HTTP PUT request with content reference 82 to the content sharing server 34.

In response to the request 82, the content sharing server 34 sends an HTTP GET request 84 to a third server 36. The third server 36 may be referred to as an adapter. The third server/adapter 36 initiates a download of the relevant content from the message storage server 32 using an IMAP download request 86. The request 86 is largely the same as the IMAP download requests 54 and 74 described above with reference to FIGS. 5 and 7 respectively. In response to the request 86, the message storage server 32 provides the requested content in message 88. The message 88 is similar to the messages 56, 66 and 76 described above (although the messages 56, 76 and 88 are in response to an IMAP request, whereas the message 66 is in response to an HTTP request, and is therefore implemented differently).

In response to the message 88, the third server issues an OK message 90, together with the requested content to the content sharing server 34. Finally, the content sharing server 34 sends an OK message (message 92) to the client 4.

The message sequence 80 differs from the message sequence 70 in that, whereas the HTTP GET request 73 is sent from the content sharing server 34 to another location on the same server (which location is able to issue IMAP requests), the HTTP GET request 84 is sent from the content sharing server 34 to the third server 36. Thus, the third server 36 performs the function of the dedicated resource described above.

The HTTP PUT request with content reference 82 may take the following form:

```
PUT /home/ivo/MyHelloWorld.txt HTTP/1.1
Host: myMediaStorage.operator.net
Content-type: message/external-body;access-
type=URL;URL="http://MyImapResolver.operator.net:12345/Resolv
eImapToHttp?TakeFrom=imap%3A%2F%2FMyMessageStorageServer.oper
ator.net%2Fivo.sedlacek@operator.net%2FMyFolder%2FMyMail%2FMy
Attachment"
```

In the message sequence 80, the HTTP PUT request with content reference message 82 includes a base URI (providing the location of the third server) as follows:
http://MyImapResolver.operator.net:12345/ResolveImap-ToHttp?TakeFrom=

The provision of a base URI in the client enables the HTTP GET message 84 to be sent to the third server 36. This arrangement is not essential.

The HTTP PUT request with content reference message 82 may be sent without including the base URI of the third server 36. In such an arrangement, the content sharing server 34 may be pre-configured with the base URI of the third server 36. (This contrasts with the embodiments described above, in which the client 4 may be pre-configured with the relevant base URI.)

Such an HTTP PUT request with content reference 82 may take the following form:

```
PUT /home/ivo/MyHelloWorld.txt HTTP/1.1
Host: myMediaStorage.operator.net
Content-type: message/external-body; access-type=URL;
URL="imap://MyMessageStorageServer.operator.net/ivo.sedlacek@
operator.net/MyFolder/MyMail/MyAttachment"
```

As discussed above, the content sharing server 34 is pre-configured to send the HTTP GET request 84 to the third server 36, the URI of which is stored at the content sharing server 34. The remainder of the message sequence 80 can proceed exactly as described above.

The HTTP PUT requests with content references 62 and 72 of the message sequences 60 and 70 respectively can be modified in similar ways.

For example, the HTTP PUT request with content reference 62 may omit the base URI of the message storage server 32, with the content sharing server 34 being pre-configured to send the HTTP GET request 64 to the relevant resource on the message storage server 32. Similarly, the HTTP PUT request with content reference 72 may omit the base URI of the resource on the content sharing server, with the content sharing server 34 being pre-configured to send the HTTP GET request 73 to the relevant resource on the content sharing server 34.

In the various embodiments of the invention described above, the HTTP PUT requests with content reference 52, 62, 72 and 82 are described as being issued by the client 4. Of course, in practice, those HTTP PUT requests may be issued by the message and media storage client 8 of the client 4.

Many of the embodiments described above make use of the IMAP protocol to obtain data from the message storage server. This is not essential. For example, other protocols, such as FTP and gopher, could be used to obtain data instead of IMAP.

In the embodiments of the invention described above, the message storage server is described as being an IMAP server. This is not essential. For example, the principles of the invention can be used to copy files between two HTTP servers.

The content sharing server 34 is generally referred to above as an HTTP server. This is not essential. For example, the content sharing server 34 may also be a WebDAV server.

The embodiments of the invention described above are illustrative rather than restrictive. It will be apparent to those skilled in the art that the above devices and methods may incorporate a number of modifications without departing from the general scope of the invention. It is intended to include all such modifications within the scope of the invention insofar as they fall within the scope of the appended claims.

The invention claimed is:
1. A method comprising:
receiving, at a first server, a request to copy content, wherein the request to copy content is received from a client device, the first server comprises a content sharing server, the request to copy content requests that content from a second server be provided to said first server, the first server and the second server are separate from the client-side of the client device, the second server comprises a message storage server, and the request to copy content comprises a hypertext-transfer-protocol PUT request that includes an indication of a location of the content on the second server;

issuing a content access request from the first server to the second server, wherein the content sharing server is configured to issue HTTP content access requests; and receiving said content at said first server in response to the content access request.

2. A method as claimed in claim 1, wherein the location of the content on the second server is identified by a base uniform resource locator in combination with a second uniform resource locator.

3. A method as claimed in claim 2, wherein the request to copy content includes the base uniform resource locator and the second uniform resource locator.

4. A method as claimed in claim 2, wherein the request to copy content is issued by a user device and wherein the user device is pre-configured to provide the base uniform resource locator.

5. A method as claimed in claim 2, wherein the request to copy content includes the second uniform resource locator and the first server provides the base uniform resource locator.

6. A method as claimed in claim 2, wherein the base uniform resource locator refers to a resource on the second server, wherein:
said content access request includes a first request to the resource on the second server; and
the content located at the second uniform resource locator is returned to the first server under the control of the resource on the second server.

7. A method as claimed in claim 6, wherein the content access request includes an HTTP GET request issued by the first server to the resource on the second server.

8. A method as claimed in claim 2, wherein the base uniform resource locator refers to a resource on the first server, wherein:
said content access request includes a first request issued by the first server to the resource on the first server; and
said content access request includes a second request issued by the resource on the first server to the second server in response to the first request of said content access request.

9. A method as claimed in claim 2, wherein the base uniform resource locator refers to a resource on a third server, wherein:
said content access request includes a first request issued by the first server to the resource on the third server; and
said content access request includes a second request issued by the resource on the third server to the second server, in response to the first request.

10. A method as claimed in claim 8, wherein the first request of the content access request comprises an HTTP GET request issued by the first server to the resource.

11. A method as claimed in claim 8, wherein the second request of the content access request includes an IMAP uniform resource indicator referring to the location of the content on the second server.

12. A first hardware-based server configured to:
receive a request to copy content, wherein the request to copy content is received from a client device, the request to copy content requesting that content at a second hardware-based server be provided to the first hardware-based server, the first hardware-based server and the second hardware-based server are separate from the client-side of the client device, and the request to copy content comprises a hypertext-transfer-protocol PUT request that includes an indication of the content on the second hardware-based server;

issue a plain binary content request from a host resource of the first hardware-based server;
issue a message-like content access request to the second hardware-based server; and
receive said content in response to the plain binary content request and the message-like content access request.

13. A first hardware-based server as claimed in claim 12, wherein the location of the content on the second hardware-based server is identified by a base uniform resource locator in combination with a second uniform resource locator.

14. A first hardware-based server as claimed in claim 13, wherein:
the base uniform resource locator refers to a resource on the second hardware-based server;
the first hardware-based server is configured to send said content access request to the resource on the second hardware-based server; and
the content located at the second uniform resource locator is returned to the first hardware-based server under the control of the resource on the second hardware-based server.

15. A first hardware-based server as claimed in claim 13, further comprising a resource, wherein:
the base uniform resource locator refers to the resource on the first hardware-based server;
said content access request includes a first request issued by the first hardware-based server to the resource on the first hardware-based server; and
the resource is configured to issue a second request of said content access request to the second hardware-based server in response to the first request.

16. A first hardware-based server as claimed in claim 13, wherein the base uniform resource locator refers to a resource on a third hardware-based server, wherein:
said content access request includes a first request issued by the first hardware-based server to the resource on the third hardware-based server; and
said content access request includes a second request issued by the resource on the third hardware-based server to the second hardware-based server, in response to the first request.

17. A first hardware-based server as claimed in claim 15, wherein the second request of the content access request includes an IMAP uniform resource indicator referring to the location of the content on the second hardware-based server.

18. A first hardware-based server as claimed in claim 12, wherein said first hardware-based server is an HTTP server.

19. A system comprising a content sharing hardware-based server, comprising an adapter, and a message storage hardware-based server, wherein:
the content sharing hardware-based server is configured to receive a request, from a client device, to copy content requesting that content at the message storage hardware-based server be forwarded to the content storage hardware-based server, the content sharing hardware-based server and the message storage hardware-based server are separate from the client-side of the client device, the request to copy content comprises a hypertext-transfer-protocol PUT request that includes an indication of a location of the content on the message storage hardware-based server;
the adapter configured to issue HTTP requests for content;
the content sharing hardware-based server is configured to issue a content access request to the message storage hardware-based server; and the message storage hardware-based server is configured to forward the content to said content sharing hardware-based server in response to the content access request.

20. A non-transitory computer-readable storage medium, having embodied thereon a computer program, the computer program comprising:
    code for receiving a request to copy multiple protocol content wherein the request to copy multiple protocol content is received from a client device, the request to copy multiple protocol content requesting that content at a server be provided to the computer program product, the computer program product and the server are separate from the client-side of the client device, and the request to copy multiple protocol content comprises a hypertext-transfer-protocol PUT request that includes an indication of a location of the content on the server;
    code for issuing a content access request to said server; and
    code for receiving said content in response to the content access request.

* * * * *